Dec. 23, 1952    E. H. ROBERTS    2,622,410
FREEZING TRAY
Filed Oct. 17, 1949
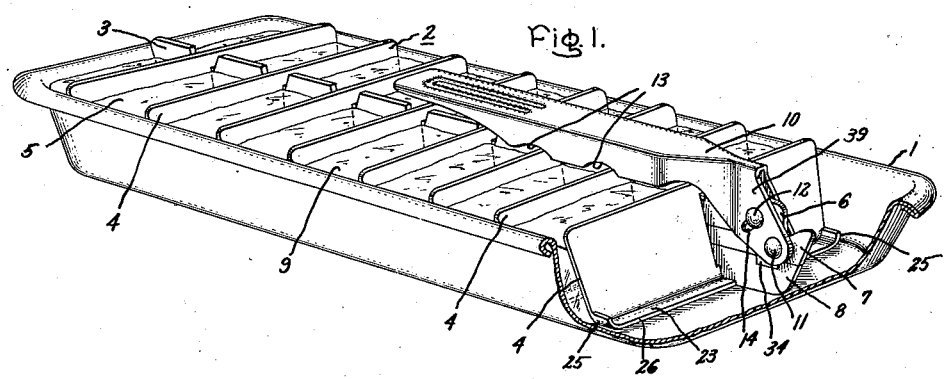
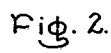
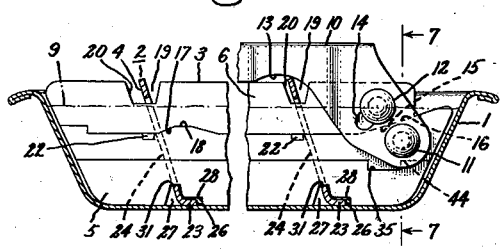
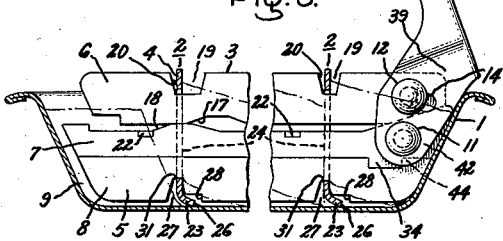
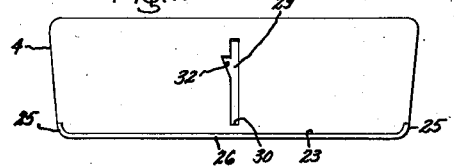
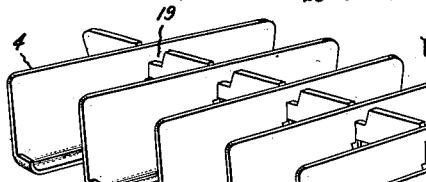
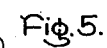
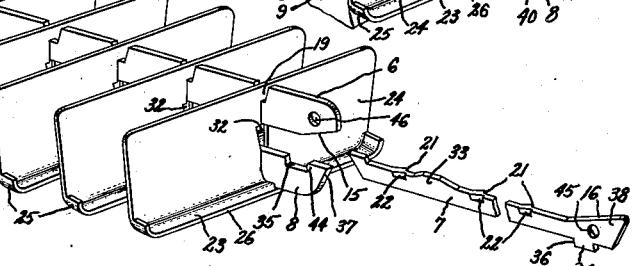
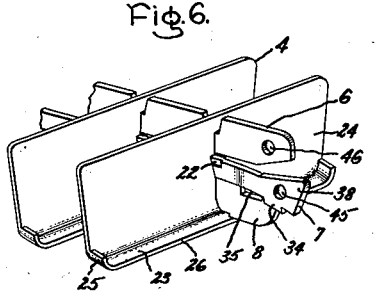
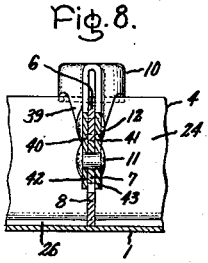
Inventor:
Edward H. Roberts,
by William G. Edwards,
His Attorney.

Patented Dec. 23, 1952

2,622,410

UNITED STATES PATENT OFFICE 2,622,410

FREEZING TRAY

Edward H. Roberts, Erie, Pa., assignor to General Electric Company, a corporation of New York Application October 17, 1949, Serial No. 121,659

11 Claims. (Cl. 62—108.5)

My invention relates to freezing trays and more particularly to freezing trays including provision for effecting release of ice blocks.

It is an object of my invention to provide a freezing tray including a plurality of ice block compartments and including an improved arrangement for effecting release of ice blocks therefrom.

It is another object of my invention to provide a freezing tray including a grid having a plurality of compartments and including an improved construction of the grid for facilitating assembly.

It is a further object of my invention to provide a grid assembly for a freezing tray including an improved arrangement for locking the parts in assembled position.

It is still another object of my invention to provide a freezing tray including a grid having a plurality of compartments for ice blocks and including provision for supporting the ice blocks when the grid is removed from the tray.

It is still a further object of my invention to provide a grid assembly for a freezing tray having inclined transverse dividers and including an improved arrangement for supporting the transverse dividers at any desired inclination with respect to the bottom of the freezing tray.

Further objects and advantages of my invention will become apparent as the following description proceeds and the features of novelty which characterize my invention will be pointed out with particularity in the claims annexed to and forming part of this specification.

In carrying out the objects of my invention I provide a grid assembly construction including a longitudinal divider and a plurality of transverse dividers wherein the transverse dividers are supported in predetermined inclined positions with respect to the bottom of the freezing tray. Lips are provided on the transverse dividers for supporting ice blocks when the grid is removed from the tray and for causing vertical lifting of the transverse dividers during the ice releasing operation. The longitudinal divider is made in three parts and is constructed to facilitate assembly of the parts and the locking of the elements of the grid in the assembled position. Provision for relative movement between parts of the longitudinal divider is made to effect release of ice blocks.

For a better understanding of my invention reference may be had to the accompanying drawings in which Fig. 1 is a perspective view partly broken away of a freezing tray embodying my invention; Fig. 2 is a sectional longitudinal elevation view of the freezing tray; Fig. 3 is a view similar to Fig. 2 showing the parts in different positions; Fig. 4 is a perspective view of a portion of the grid of the freezing tray illustrating the ice block supporting feature; Fig. 5 is a partly exploded perspective view of the grid; Fig. 6 is a perspective view of a portion of the grid in a partially assembled position; Fig. 7 is an elevation view of one of the transverse dividers; and Fig. 8 is a transverse sectional elevation view taken along the line 7—7 of Fig. 2.

Referring now to Figs. 1, 2, and 3 there is shown a rectangular freezing tray 1 having a grid 2 arranged therein. The grid includes a longitudinal divider 3 and a plurality of transverse dividers 4 arranged to provide a plurality of ice block compartments 5.

The longitudinal divider 3 is made of three parts or sections, 6, 7, and 8. These parts, in the assembled position, are arranged one above the other in the same vertical plane. The transverse dividers are adapted to occupy a normal position inclined with respect to the bottom of the tray, as shown in Fig. 2, and are adapted to be moved to a generally vertical position, as shown in Fig. 3, in effecting release of ice blocks 9. In order to effect such movement of the transverse dividers the top and center sections 6 and 7, respectively, of the longitudinal divider are arranged for relative movement and a handle 10 is provided for effecting this relative movement of the top and center positions of the longitudinal divider. The handle 10 is secured to the center longitudinal section 7 by a pin 11 and to the top section 6 by a pin 12. The handle is provided with recesses 13 in the underside thereof for gripping and includes an elongated slot 14 adapted to cooperate with the pin 12 to provide a lost motion connection so that the handle may be lifted freely a short distance and gripped before force is applied to release the ice blocks. The top and center sections 6 and 7, respectively, of the longitudinal divider are shaped so that both a relative longitudinal or horizontal movement of the top and center sections and a relative vertical movement of these sections are secured. This is accomplished by providing cooperating inclined surfaces 15 and 16 on the top and center longitudinal sections at one end thereof and similarly cooperating inclined surfaces 17 and 18 on the top and center sections, respectively, near the opposite end. As a relative longitudinal movement is imparted to the sections 6 and 7 by the movement of handle 10 from the position shown at Fig. 2 to that shown at Fig. 3 the inclined surfaces 15, 16 and 17, 18 cause an upward movement of the top section 6 relative to the center section 7, this latter relative movement also assisting in effecting release of ice blocks. Although the cooperating inclined surfaces have been shown on two sections of a three-part longitudinal divider, it will be obvious that this arrangement for securing a relative vertical movement and is equally applicable to a two-part longitudinal divider.

A plurality of notches or recesses 19 are formed in the upper edge of the top longitudinal section 6 to provide shoulders 20 for engaging the transverse dividers to move the dividers from the inclined position shown in Fig. 2 to the vertical position shown in Fig. 3 during the ice-releasing operation. In order to minimize the force required, these notches or recesses are preferably arranged so as to progressively engage the transverse dividers during the ice-releasing operation. For example, referring to Fig. 2, it can be seen that the shoulder 20 at the right end of the top section 6 of the longitudinal divider is spaced only very slightly from the extreme right-hand transverse divider. At the same time the shoulder 20 at the left end of the top section 6 is spaced a substantial distance from the extreme left-hand transverse divider. The distance between each transverse divider and its corresponding shoulder 20 progressively increases from the extreme right-hand divider through the intermediate dividers (not shown in Fig. 2) to a maximum at the extreme left-hand divider shown. Thus, as the handle 10 is moved from the position shown in Fig. 2 to that shown in Fig. 3 during the ice-releasing operation the transverse dividers are engaged one at a time beginning with the extreme right-hand divider.

In order to support the transverse dividers in a predetermined inclined position with respect to the bottom of the tray a plurality of shoulders 21 are provided on the center section 7 of the longitudinal divider, one of these shoulders 21 being arranged to engage and support each of the transverse dividers. As best shown in Fig. 5, these shoulders 21 may readily be formed by pressing a portion of the center section 7 of the longitudinal divider laterally, forcing this portion out of plane of the body of the section 7 and leaving recesses 22 on one side of the section 7 and shoulders 21 on the other side.

It is often desirable to remove only a limited number of ice blocks from the grid leaving the remainder for subsequent use. In order to permit the removal, when desired, of only a limited number of ice blocks from the grid 2, a lip 23 is provided at the lower end of each of the transverse dividers 4. These lips extend the full width of the transverse dividers so as to provide supports for the ice blocks 9. As shown in Fig. 2 each of the lips 23 forms an obtuse angle with the remainder 24 of its corresponding transverse divider so that the lips occupy a generally horizontal position adjacent the bottom of the tray in the normal position of the grid. When release of ice blocks from engagement with the grid and the tray has been effected by moving the handle to the position shown in Fig. 3, the entire grid 2 may be lifted from the tray as illustrated in Fig. 4. In the form illustrated the two ice blocks at the extreme right-hand end and the two ice blocks at the extreme left-hand end of the tray are not removed with the grid. As shown in Fig. 4, the remaining ice blocks are prevented from falling out of the compartments 5 through the bottom of the grid by the lips 23 on the transverse dividers. Although for convenience in manufacture the lips 23 have been illustrated as extending along the entire width of the transverse dividers it will be apparent that, if desired, lip sections substantially less than the full width of the dividers could be employed and still provide the necessary support for the ice blocks. In order to prevent the ice blocks from sliding laterally out the sides of the grid should the grid be tilted slightly in either direction when removed from the tray, the ends of the lips 23 are curved upwardly as indicated at 25. After the grid has been removed from the tray any desired number of ice blocks may be removed by grasping the individual ice block, lifting the outer end slightly, and withdrawing it laterally from the grid. The remaining ice blocks continue to be supported by the grid and may be returned to the tray with the grid, resuming the position shown in Fig. 2.

In addition to supporting the ice blocks as described above the lips 23 also assist in the ice-releasing operation. As can be seen by comparison of Figs. 2 and 3, the lips 23 are arranged to project in the general direction of movement of the top section 6. Hence, as the handle is lifted and the top section 6 of the longitudinal divider is moved toward the right, the transverse dividers are caused to pivot about their extreme edges 26 in moving from the position shown in Fig. 2 to that shown in Fig. 3. Hence, the provision of the lips 23 causes an upward movement of the transverse dividers assisting in the ice-releasing operation. The bottom section 8 of the longitudinal divider includes a plurality of recesses 27, one of these recesses being arranged adjacent the bottom of each of the transverse dividers 4. These recesses are shaped to include a portion 28 which provides a space for the lips 23 of the transverse dividers. A vertical slot 29 is provided in each of the transverse dividers. As the transverse dividers are moved upwardly by pivoting about the extremities of the lips 23, the surface 30 adjacent the bottom of each of the slots 29 engages a surface 31 at the top of the corresponding recess 27 to effect upward movement of the bottom section 8 of the longitudinal divider and of the remaining sections of the longitudinal divider relative to the freezing tray.

The operation of the freezing tray may be summarized as follows. When it is desired to effect release of ice blocks from the tray and from the grid the handle is lifted slightly, as permitted by the lost motion connection, and is gripped, utilizing the finger recesses 13. The handle is then moved to the position shown in Fig. 3. During this movement the top longitudinal section is moved to the right relative to the adjacent center longitudinal section and is also moved upwardly because of the cooperating inclined surfaces 15, 16 and 17, 18. Both these relative movements assist in releasing the ice blocks. The movement of the top longitudinal section causes progressive engagement of the transverse dividers by the shoulders 20 of the top longitudinal section, and progressive movements of the transverse dividers to the generally vertical positions shown in Fig. 3. At the same time the pivoting of the transverse dividers about the extremities 26 of the lips 23 causes an upward movement of these dividers and, through the engagement of the dividers with the surfaces 31 of the bottom longitudinal section adjacent the recesses 27 therein, effects an upward movement of the bottom longitudinal section and of the remainder of the longitudinal divider relative to the freezing tray. All of these relative movements contribute to an effective release of the ice blocks from the tray and from the grid. After the ice blocks have thus been released the grid may be lifted from the tray, the grid being conveniently held by grasping the handle 10. The extreme right-hand and the extreme left-hand pairs of ice blocks remain in the tray, but the remaining ice blocks are retained by the grid because of the ice block supporting lips 23, and one or more of these ice blocks may be manually removed through the side openings in the grid as described above. The grid, together with the ice blocks not desired at the time, is then returned to the tray to the position shown in Fig. 2.

The particular construction of the elements of the grid facilitates the assembly of the grid and the locking of the elements in the assembled position. This arrangement is shown most clearly in Figs. 5, 6, 7, and 8. As shown in these figures each of the transverse dividers includes the vertical slot 29 for receiving the three parts 6, 7, and 8 of the longitudinal divider. The vertical slot 29 includes an inclined recess 32 extending laterally therefrom generally adjacent the center section of the longitudinal divider in the assembled position of the grid. In assembling the parts of the grid the top and bottom sections 6 and 8 of the longitudinal divider are first inserted through the slots 29 in the transverse dividers. The top section 6 is moved upwardly to the position shown in Fig. 5, such movement being permitted by the alignment of the recesses 19 in the section 6 with the transverse dividers 4. Similarly, the bottom section 8 is moved downwardly to the position shown in Fig. 5, this movement being permitted by the alignment of the recesses 27 in the bottom section with the transverse dividers. Finally, the center section 7 of the longitudinal divider is inserted between the sections 6 and 8. During this insertion the center section 7 is inclined with respect to a plane through the sections 6 and 8 so that the upper portion 33 of the section 7 projects into the inclined recess 32. The inclination of the section 7 and the provision of the recess 32 permits the passage of the laterally offset shoulders 21 through the vertical slot 29. Near its right-hand end the section 7 is provided with a projection or tongue 34 which is adapted, in the assembled position of the grid, to coperate with a recess 35 formed near the right-hand end of the bottom section 8 of the longitudinal divider. When the section 7 has been moved toward its assembled position to the extent that a shoulder 36 of the tongue 34 is adjacent the end 37 of the section 8, the right-hand end 38 of section 7 is manually deflected toward one side, for example, to the left as indicated in Fig. 6. This permits movement of the section 7 into a position wherein the tongue 34 and the recess 35 are in alignment. At this point the lateral force on the section 7 is removed and the resilience of the material of which the section 7 is composed causes the end 38 to move back into the plane of the remainder of section 7 bringing the tongue 34 into engagement with the recess 36. The cooperation of the tongue and the recess lock the sections 7 and 8 of the longitudinal divider against movement. In order to prevent lateral movement of the end 38 of the section 7 which might permit disengagement of sections 7 and 8, the handle 10 includes a bifurcated portion 39 which extends along both sides of sections 6 and 7 of the longitudinal divider. As can be seen most clearly from Fig. 8 the two portions 40 and 41 of the bifurcated portion 39 of the handle extend closely adjacent opposite sides of the sections 6 and 7 of the longitudinal dividers preventing deflection of the end 38 of section 7 relative to section 6. Moreover, the lower ends 42 and 43 extend adjacent a portion 44 of the lower section 8 so as to retain all three sections 6, 7, and 8 of the longitudinal divider in the same vertical plane. The handle construction also prevents tilting of the center longitudinal section 7 out of the plane of the top and bottom sections, thus further assisting in preventing accidental disassembly of the grid. The pins 11 and 12 pass through the bifurcated portion 39 of the handle and through an opening 45 in the center section 7 and opening 46 in the top section 6, respectively, of the longitudinal divider, holding the handle in position and locking the entire grid assembly against accidental disassembly during use.

While I have shown and described specific embodiments of my invention, I do not desire my invention to be limited to the particular construction shown and described, and I intend by the appended claims to cover all modifications within the spirit and scope of my invention.

What I claim as new and desire to secure by Letters Patent of the United States is:

1. A grid for a freezing tray comprising a longitudinal divider, a plurality of transverse dividers, said longitudinal divider including top, center and bottom superimposed sections each extending lengthwise of the tray, each of said transverse dividers having a single vertical slot therein for receiving said top, center and bottom sections of said longitudinal divider, each of said slots having a recess extending from one side thereof adjacent said center longitudinal section, each of said recesses including an inclined surface directly laterally adjacent said center longitudinal section whereby said center longitudinal section may be inclined from the plane of said top and said bottom sections to project into said recess for permitting movement of said center longitudinal section into assembled position, and a handle engaging said top and said center longitudinal sections for effecting relative movement of said top and said center sections to release ice blocks, said handle including a portion extending adjacent both sides of said bottom section and maintaining said center longitudinal section in the plane of said top and said bottom longitudinal sections to prevent accidental disassembly of said grid.

2. A grid for a freezing tray comprising a longitudinal divider, a plurality of transverse dividers, said longitudinal divider including top, center and bottom superimposed sections each extending lengthwise of the tray, each of said transverse dividers having a single vertical slot therein for receiving said sections of said longitudinal divider, said center and said bottom longitudinal sections including a cooperating tongue and recess for preventing relative longitudinal movement of said center and said bottom sections, one of said last-named sections being composed of a resilient material to permit lateral deflection of an end of said one of said last-named sections during assembly to permit moving said tongue and said recess into aligned positions, and a handle carried by said top and said center longitudinal sections for effecting relative movement of said top and said center sections to release ice blocks, said handle including a bifurcated portion extending adjacent both sides of said one of said last-named sections and at least one other of said longitudinal sections for preventing lateral deflection of said end of said one of said sections to prevent accidental disassembly of said grid.

3. A grid for a freezing tray comprising a longitudinal divider, a plurality of transverse dividers, said longitudinal divider including top, center and bottom superimposed sections each extending lengthwise of the tray, each of said transverse dividers having a single vertical slot therein for receiving said sections of said longitudinal divider, said center and said bottom longitudinal sections including a cooperating tongue and recess for preventing relative longitudinal movement of said center and said bottom sections, said center section being composed of a resilient material to permit lateral deflection of an end of said center section during assembly to permit moving said tongue and said recess into aligned positions, and a handle carried by said top and said center longitudinal sections for effecting relative movement of said top and said center sections to release ice blocks, said handle including a bifurcated portion extending adjacent both sides of each of said longitudinal sections for preventing lateral deflection of said end of said center section to prevent accidental disassembly of said grid.

4. A grid for a freezing tray comprising a longitudinal divider and a plurality of transverse dividers, said longitudinal divider including top, center and bottom superimposed sections each extending lengthwise of the tray, each of said transverse dividers having a single vertical slot therein for receiving said top, center, and bottom sections of said longitudinal divider, each of said slots having a recess extending laterally therefrom adjacent said center longitudinal section, said recess including an inclined surface directly laterally adjacent said center longitudinal section, said center longitudinal section including laterally projecting shoulders for supporting each of said transverse dividers in a predetermined inclined position, said shoulders being laterally adjacent to said inclined surfaces and being received within said recess for permitting tilting of said center section out of the plane of said top and said bottom sections during assembly whereby said laterally-projecting shoulders may pass through said slots during assembly.

5. A grid for a freezing tray comprising a longitudinal divider and a plurality of inclined transverse dividers for providing a plurality of compartments for ice blocks, said longitudinal divider including top, center and bottom superimposed sections each extending lengthwise of the tray, each of said transverse dividers having a vertical slot therein for receiving said sections of said longitudinal divider, said top longitudinal section including a plurality of notches, one of said notches being positioned adjacent each of said transverse dividers, and means for effecting movement of said top longitudinal section to cause the portions of said top longitudinal section adjacent said notches to engage said transverse dividers for causing a pivoting of said transverse dividers from the inclined position toward a vertical position to effect release of ice blocks, each of said transverse dividers including a horizontally extending lip adjacent and parallel to the bottom of the tray and extending in a direction opposite the direction of inclination of said transverse dividers, said transverse dividers pivoting on the outer extremities of said lips to cause an upward movement of said transverse dividers during the ice releasing operation.

6. A grid for a freezing tray comprising a longitudinal divider and a plurality of inclined transverse dividers for providing a plurality of compartments for ice blocks, said longitudinal divider being formed of top, center and bottom superimposed sections each extending lengthwise of the tray, each of said transverse dividers having a vertical slot therein for receiving said sections of said longitudinal divider, said top longitudinal section including a plurality of notches, one of said notches being positioned adjacent each of said transverse dividers, and means for effecting movement of said top longitudinal section to cause the portions of said top longitudinal section adjacent said notches to engage said transverse dividers for causing a pivoting of said transverse dividers from the inclined position toward a vertical position to effect release of ice blocks, each of said transverse dividers including a horizontally extending lip adjacent and parallel to the bottom of the tray and extending in a direction opposite the direction of inclination of said transverse dividers, said transverse dividers pivoting on the outer extremities of said lips to cause an upward movement of said transverse dividers during the ice releasing operation, said lips further affording support for ice blocks when said grid is removed from said tray and permitting manual withdrawal of ice blocks laterally from said grid, the lateral ends of each of said lips extending upwardly to prevent the ice blocks from accidentally sliding laterally from said grid.

7. In a freezing tray comprising a longitudinal divider, and a plurality of transverse dividers having slots therein for receiving the longitudinal divider, the longitudinal divider being formed of top, center and bottom superimposed sections each extending the length of the tray, the method of assembling the grid which comprises aligning the transverse dividers, inserting said bottom longitudinal section through said slots in said transverse dividers, inserting said top longitudinal section through said slots in said transverse dividers, moving said top and bottom sections upwardly and downwardly respectively for providing a space for receiving said center longitudinal section between said top and said bottom longitudinal sections, inserting said center longitudinal sections between said top and said bottom sections, laterally deflecting one end of said center longitudinal section during the final movement thereof to its assembled position, releasing said deflected center longitudinal section, providing a handle overlapping said top, center and bottom longitudinal sections, and securing said handle to said top and said center longitudinal sections.

8. In a freezing tray comprising a longitudinal divider, a plurality of transverse dividers each having a slot therein and including a recess extending laterally from the slot, the longitudinal divider being formed of top, center and bottom superimposed sections each extending lengthwise of the tray, the method of assembling the grid which comprises aligning the transverse dividers, inserting said bottom longitudinal section through said slots in said transverse dividers, inserting said top longitudinal section through said slots in said transverse dividers, moving said top and said bottom sections upwardly and downwardly respectively for providing a space for receiving said center longitudinal section between said top and said bottom longitudinal sections, inserting said center longitudinal section in an inclined position between said top and said bottom sections, laterally deflecting one end of said center longitudinal section during the final movement thereof to its assembled position, turning said inclined center longitudinal section into the plane of said top and said bottom longitudinal sections, releasing said deflected center longitudinal section, providing a handle overlapping said top, center and bottom longitudinal sections, and securing said handle to said top and said center longitudinal sections.

9. A grid for a freezing tray comprising a longitudinal divider and a plurality of transverse dividers assembled on said longitudinal divider for providing a plurality of compartments for ice blocks, said transverse dividers being mounted on said longitudinal divider for pivoting movement relative to said longitudinal divider, each of said transverse dividers including a lip adjacent and extending parallel to the bottom of the tray, and means for effecting pivoting of said transverse dividers about the outer extremities of said lips for effecting release of ice blocks.

10. A grid for a freezing tray comprising a longitudinal divider and a plurality of transverse dividers assembled on said longitudinal divider for providing a plurality of compartments for ice blocks, said longitudinal divider including at least two superimposed relatively movable sections extending lengthwise of said grid, said transverse dividers being mounted on said longitudinal divider in planes inclined to the vertical, each of said transverse dividers including a lip adjacent and extending parallel to the bottom of the tray in the direction opposite the direction of inclination of said transverse dividers, and means for pivoting said transverse dividers from the inclined position toward the vertical position about the outer extremities of said lips for effecting release of ice blocks, said means effecting movement of the top one of said longitudinal sections relative to another of said longitudinal sections to cause pivoting of said transverse dividers.

11. A grid for a freezing tray comprising a longitudinal divider and a plurality of transverse dividers for providing a plurality of compartments for ice blocks, said longitudinal divider including two superimposed sections extending lengthwise of said grid, each of said transverse dividers having a vertical slot therein for receiving said sections of said longitudinal divider, the upper one of said longitudinal sections including a plurality of notches, one of said notches being positioned adjacent each of said transverse dividers, a handle connected to said sections of said longitudinal divider at one end of said grid for effecting relative longitudinal movement of said longitudinal sections, each of said transverse dividers being inclined from the vertical in a direction away from said handle end of said grid, each of said transverse dividers further including a horizontal lip adjacent the bottom of the tray extending in a direction toward said handle end of said grid, movement of said handle effecting movement of said upper longitudinal section in a direction towards said handle end of said grid to cause the portions of said upper longitudinal section adjacent said notches to engage said transverse dividers for pivoting said dividers about the outer extremities of said lips to effect release of ice blocks, said lips further affording support for ice blocks when said grid is removed from said tray and affording manual withdrawal of ice blocks laterally from said grid.

EDWARD H. ROBERTS.

REFERENCES CITED

The following references are of record in the file of this patent:

UNITED STATES PATENTS

| Number | Name | Date |
|---|---|---|
| 2,169,180 | Jacobs | Aug. 8, 1939 |
| 2,278,221 | Siedle | Mar. 31, 1942 |
| 2,286,693 | Steenstrup | June 16, 1942 |
| 2,313,932 | Gerard | Mar. 16, 1943 |
| 2,444,789 | Reeves | July 6, 1948 |
| 2,473,178 | Siebigteroth | June 14, 1949 |